(12) United States Patent
Mace et al.

(10) Patent No.: US 8,020,304 B2
(45) Date of Patent: Sep. 20, 2011

(54) POWER TRANSMISSION ASSEMBLY FOR TOOL MOUNTED ON AN ELONGATE POLE

(75) Inventors: William B. Mace, Spring Grove, IL (US); Ronald A. Carlson, Elgin, IL (US)

(73) Assignee: Echo, Incorporated, Lake Zurich, IL (US)

( * ) Notice: Subject to any disclaimer, the term of this patent is extended or adjusted under 35 U.S.C. 154(b) by 512 days.

(21) Appl. No.: 12/069,863

(22) Filed: Feb. 13, 2008

(65) Prior Publication Data

US 2009/0199415 A1    Aug. 13, 2009

(51) Int. Cl.
*B27B 17/02* (2006.01)

(52) U.S. Cl. .............. 30/381; 30/296.1; 464/52; 464/53

(58) Field of Classification Search ............. 30/276, 30/296.1, 381, 298; 464/51, 52, 53, 57
See application file for complete search history.

(56) References Cited

U.S. PATENT DOCUMENTS

| | | | | |
|---|---|---|---|---|
| 401,881 A * | 4/1889 | Gare | ............. | 464/60 |
| 1,871,528 A * | 8/1932 | Joline | ............. | 464/53 |
| 2,703,928 A * | 3/1955 | Southwick | ............. | 30/386 |
| 2,917,909 A * | 12/1959 | Josutis | ............. | 464/58 |
| 3,343,613 A * | 9/1967 | Carnesecca, Jr. | ............. | 173/169 |
| 4,207,675 A * | 6/1980 | Causey et al. | ............. | 30/296.1 |
| 4,226,021 A * | 10/1980 | Hoff | ............. | 30/276 |
| 4,281,504 A * | 8/1981 | Moore | ............. | 56/10.3 |
| 4,392,614 A * | 7/1983 | Groth et al. | ............. | 239/215 |
| 4,421,495 A * | 12/1983 | Kulischenko | ............. | 464/51 |
| 4,451,983 A * | 6/1984 | Johnson et al. | ............. | 30/276 |
| 4,505,040 A * | 3/1985 | Everts | ............. | 30/296.1 |
| 4,714,447 A * | 12/1987 | Hironaka | ............. | 464/52 |
| 4,924,573 A * | 5/1990 | Huddleston et al. | ............. | 30/272.1 |
| 5,013,282 A * | 5/1991 | Keller | ............. | 464/172 |
| 5,175,932 A * | 1/1993 | Lange et al. | ............. | 30/276 |
| 5,364,307 A * | 11/1994 | Shaulis | ............. | 464/52 |
| 5,718,050 A * | 2/1998 | Keller et al. | ............. | 30/123.4 |
| 5,802,724 A * | 9/1998 | Rickard et al. | ............. | 30/296.1 |
| 5,839,961 A * | 11/1998 | Andress | ............. | 464/52 |
| 6,182,367 B1 * | 2/2001 | Janczak | ............. | 30/392 |
| 6,474,747 B2 * | 11/2002 | Beaulieu et al. | ............. | 30/296.1 |
| 6,726,568 B2 * | 4/2004 | Tanaka | ............. | 464/52 |
| 6,913,539 B1 * | 7/2005 | Scherer | ............. | 464/51 |
| 2006/0276247 A1 * | 12/2006 | Martinez | ............. | 464/78 |

* cited by examiner

*Primary Examiner* — Hwei-Siu C Payer
(74) *Attorney, Agent, or Firm* — Wood, Phillips, Katz, Clark & Mortimer

(57) ABSTRACT

A powered apparatus having an elongate pole, a drive at a proximal region of the elongate pole and operable to rotate a first component on the drive, a tool at a distal region of the elongate pole with a second component that is rotatable to operate the tool, and a power transmission assembly for transmitting a drive force generated by rotation of the first component to the second component to thereby operate the tool. The power transmission assembly has a flexible drive link with a flexible length located between the drive and at least one other substantially inflexible drive part that is downstream of the drive link. The flexible length of the flexible drive link is greater than four (4) inches.

25 Claims, 6 Drawing Sheets

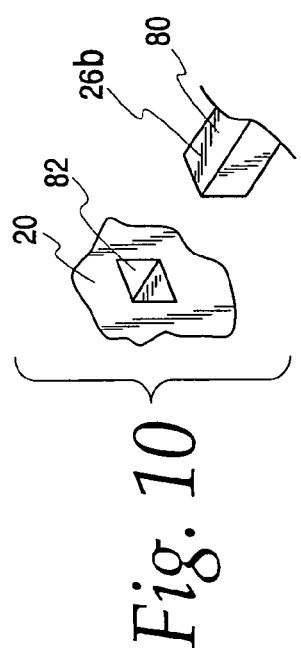
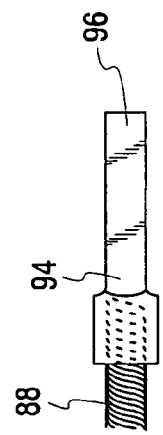
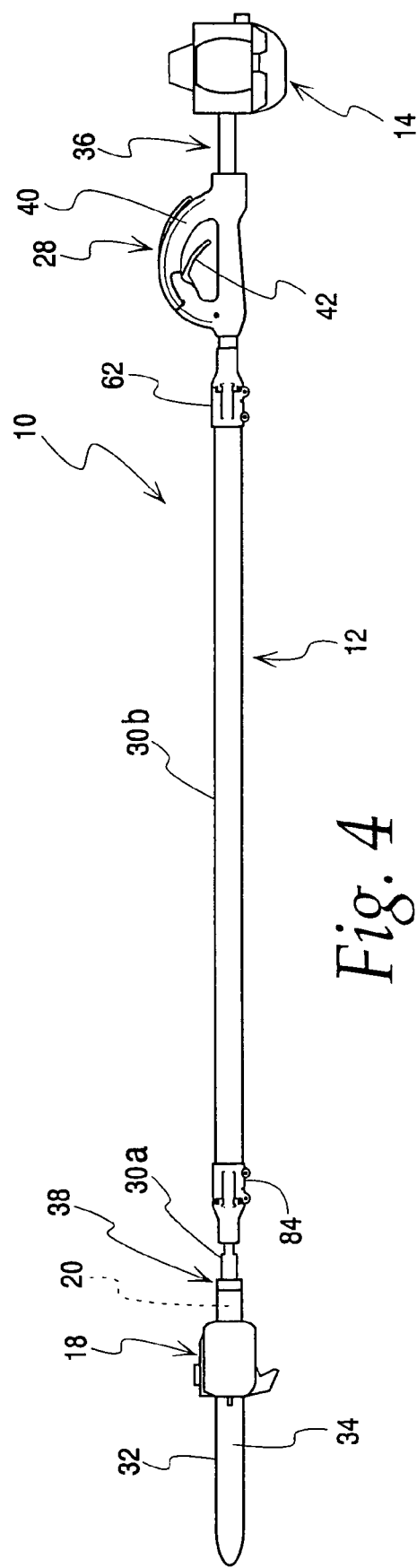

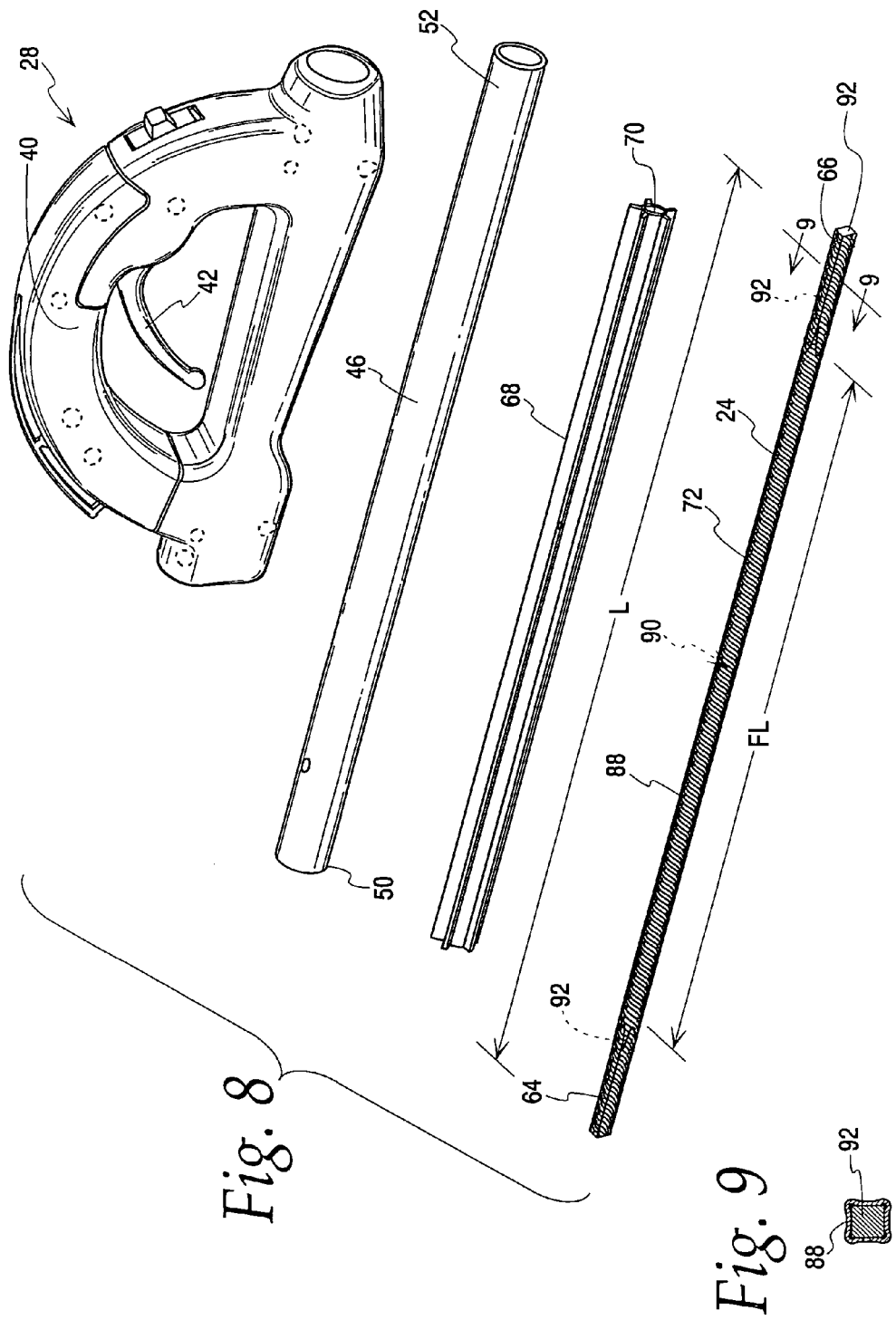

POWER TRANSMISSION ASSEMBLY FOR TOOL MOUNTED ON AN ELONGATE POLE

BACKGROUND OF THE INVENTION

1. Field of the Invention

This invention relates to an apparatus of the type having a tool that is mounted at the distal region of an elongate pole and, more particularly, to such an apparatus wherein the tool is operated by a rotary force initiated by a drive at the proximal region of the elongate pole.

2. Background Art

Myriad apparatus are currently available having a tool mounted at the distal region of an elongate pole. One exemplary tool construction incorporates a chain that is driven guidingly in an endless path to cut small trees or branches. A user repositions the tool by manipulating the elongate pole from the proximal region thereof. At the proximal region of the elongate pole, a drive is provided for the tool. The drive typically is powered by a combustible fuel, household current, or a battery. The drive produces an operating drive torque at the output end of a power transmission assembly.

Power transmission assemblies in this environment currently exist in many different forms. In one of the simplest forms, a relatively inflexible shaft of fixed length extends between the tool and drive and has end couplings that are keyed to: a) be rotated by the drive; and b) rotate an input component on the tool to effect operation thereof. One example of this construction is shown in U.S. Pat. No. 6,880,248 (Weissert et al.).

The use of flexible shafts, of fixed length extending substantially fully between a tool and drive, is also known. This construction accommodates, among other designs, non-straight pole constructions.

Elongate poles with variable lengths are also known, as seen for example in U.S. Pat. No. 4,991,298 (Matre).

Regardless of the specific construction selected, designers of this type of equipment must contend with two, often competing, objectives: a) positive drive force transmission; and b) absorption of torque loading, and particularly shock loads. This is particularly a problem with respect to tools that incorporate chains for tree cutting. In this environment, the chain is prone to encountering significant cutting resistance and, in an extreme case, binding that significantly inhibits, or arrests, chain movement.

If no shock absorbing structure is incorporated, various system components are prone to being broken. This breakage could occur at the tool, shaft, and/or the drive. Such breakage may have serious direct and indirect financial consequences, particularly for those using equipment in businesses, such as landscaping.

It is known to incorporate clutch mechanisms into such systems, as at one or both ends of the power transmission assembly. While addressing the problem of shock loading, the clutch mechanisms potentially introduce other problems.

First of all, such mechanisms add another level of complication and cost to the overall design. More complicated structures generally also increase the likelihood of malfunction.

Secondly, the clutch mechanisms, to be effective, may lower the maximum drive torque below an optimal level.

A power transmission assembly that utilizes a flexible shaft, fully between a tool and drive, while potentially absorbing detrimental shock loads, may also introduce other problems. Most notably, it may not be possible to generate the desired level of drive torque.

Further, provision must be made to accommodate twisting and bending of a highly flexible component. This may complicate the system design and/or change its geometry in a detrimental matter.

It is also known, as the assignee herein does with certain of its equipment, to incorporate a short, flexible component at the input end of the power transmission assembly. This flexible component has been in the form of a coiled member having an overall length on the order of 3 to 6 inches, and a flexing length of approximately 4 inches. The ends of the member are keyed to the drive and a downstream component on the power transmission assembly. The intent of this design is to exploit the advantages of both rigid and flexible power transmission components, with the former desired for its positive force transmission capabilities, and the latter for its shock load absorption capabilities.

This design has reduced, to a certain extent, the failures associated with shock loading. However, there have nonetheless been an appreciable amount of failures in the field that warrant new designs for power transmission assemblies of this type.

SUMMARY OF THE INVENTION

In one form, the invention is directed to a powered apparatus having: an elongate pole with a proximal region and a distal region; a drive at the proximal region of the elongate pole and operable to rotate a first component on the drive around a first axis; a tool at the distal region of the elongate pole and having a second component that is rotatable around a second axis in a first direction to operate the tool; and a power transmission assembly for transmitting a drive force generated by rotation of the first component to the second component to cause rotation of the second component around the second axis and thereby operation of the tool. The power transmission assembly consists of a flexible drive link with a flexible length extending along a third axis. The flexible drive link is located between the drive and at least one other substantially inflexible drive part that is downstream of the drive link. The flexible length of the flexible drive link is greater than four (4) inches.

In one form, the flexible length of the flexible drive link is at least twelve (12) inches.

In one form, the flexible length of the flexible drive link is on the order of seventeen (17) inches.

In one form, the flexible length of the flexible drive link is made up of at least one coiled member.

In one form, the flexible drive link consists of one continuously coiled member extending over a substantial portion of the flexible length of the flexible drive link.

In one form, the flexible length of the flexible drive link has a deflection/windup rating of substantially less than 35 degrees/ft at a 70 in/pound load.

In one form, the flexible length of the flexible drive link has a deflection/windup rating on the order of 18 degrees/ft at a 70 in/pound load.

In one form, the flexible drive link is capable of absorbing on the order of 26 degrees of windup in response to a shock load that resists rotation of the second component in the first direction around the second axis.

In one form, the elongate pole has a length that is at least five (5) feet.

In one form, the elongate pole has a handle assembly at the proximal region of the elongate pole. The handle assembly has a sleeve within which the flexible drive link resides. The handle assembly has axially spaced ends that are attachable one each to the drive and an elongate pole section that resides between the handle assembly and tool.

In one form, the handle assembly includes a handle portion around which a user's hand can be wrapped to hold and manipulate the powered apparatus.

In one form, the sleeve has a central axis and axially spaced ends and the flexible drive link extends axially beyond each of the axially spaced ends of the sleeve.

In one form, the flexible drive link has spaced first and second ends and the first end of the flexible drive link can be press fit into keyed operative relationship with the drive.

In one form, the second end of the flexible drive link can be press fit into keyed operative relationship with the at least one other substantially inflexible drive part.

In one form, the tool has a cutting chain that moves in an endless cutting path.

In one form, the flexible length of the flexible drive link has a generally circular cross-sectional shape and spaced ends and one of the spaced ends is changed from the generally circular cross-sectional shape to define a connecting fitting.

In one form, the flexible drive link has a hollow core and there is an insert in the core at one of the spaced ends.

In one form, the insert has a non-circular outer surface and the coiled member is conformed to the non-circular outer surface of the insert.

In one form, the flexible drive link has spaced ends and there is a sleeve member that surrounds and is secured at one of the spaced ends to define a connecting fitting.

In one form, the elongate pole has a variable length.

In one form, the invention consists of a powered apparatus having: an elongate pole with a proximal region and a distal region; a drive at the proximal region of the elongate pole and operable to rotate a first component on the drive around a first axis; a tool at the distal region of the elongate pole and having a second component that is rotatable around a second axis in a first direction to operate the tool; and a power transmission assembly for transmitting a drive force generated by rotation of the first component to the second component to cause rotation of the second component around the second axis and thereby operation of the tool. The power transmission assembly has a flexible drive link with a flexible length extending along a third axis. The elongate pole has a handle assembly at the proximal region of the elongate pole. The handle assembly consists of a sleeve within which the flexible drive link resides. The handle assembly further has axially spaced ends that are attachable one each to the drive and an elongate pole section that resides between the handle assembly and tool.

In one form, the handle assembly has a handle portion around which a user's hand can be wrapped to hold and manipulate the powered apparatus.

In one form, the sleeve has a central axis and axially spaced ends and the flexible drive link extends axially beyond each of the axially spaced ends of the sleeve.

In one form, the flexible drive link has spaced first and second ends and the first end of the flexible drive link can be press fit into keyed operative relationship with the drive.

In one form, the second end of the flexible drive link can be press fit into keyed operative relationship with a drive part between the handle assembly and tool.

BRIEF DESCRIPTION OF THE DRAWINGS

FIG. 4 is a side elevation view of one specific form of powered apparatus, made according to the present invention and incorporating the components in FIGS. 1-3;

FIG. 8 is an enlarged, exploded, perspective view of the handle assembly, including a flexible drive link;

FIG. 9 is a cross-sectional view of the drive link taken along line 9-9 of FIG. 8;

FIG. 10 is an enlarged, fragmentary, perspective view of the connection of one of the drive parts and tool; and FIG. 11 is a fragmentary, elevation view of a modified form of drive link.

DETAILED DESCRIPTION OF THE DRAWINGS

Figure 1:
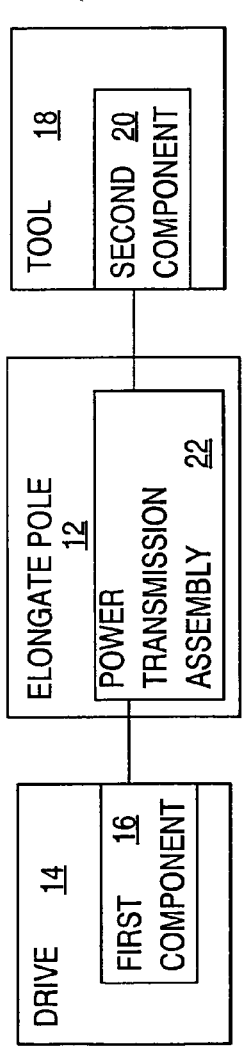
FIG. 1 is a schematic representation of one form of powered apparatus, according to the present invention, and including an elongate pole with a distal region at which a tool is mounted and a proximal region at which a drive is mounted for the tool.

The invention is directed to a powered apparatus of the type shown generically at 10 in FIG. 1. The powered apparatus 10 consists of an elongate pole 12 with a proximal region and a distal region. A drive 14 is provided at the proximal region of the elongate pole 12 and is operable to rotate a first component 16 on the drive 14 around a first axis. A tool 18 at the distal region of the elongate pole 12 has a second component 20 that is rotatable around a second axis in a first direction to operate the tool 18. A power transmission assembly 22 transmits a drive force generated by rotation of the first component 16 to the second component 20 to cause rotation of the second component 20 around the second axis and thereby operation of the tool 18.

Figure 2:
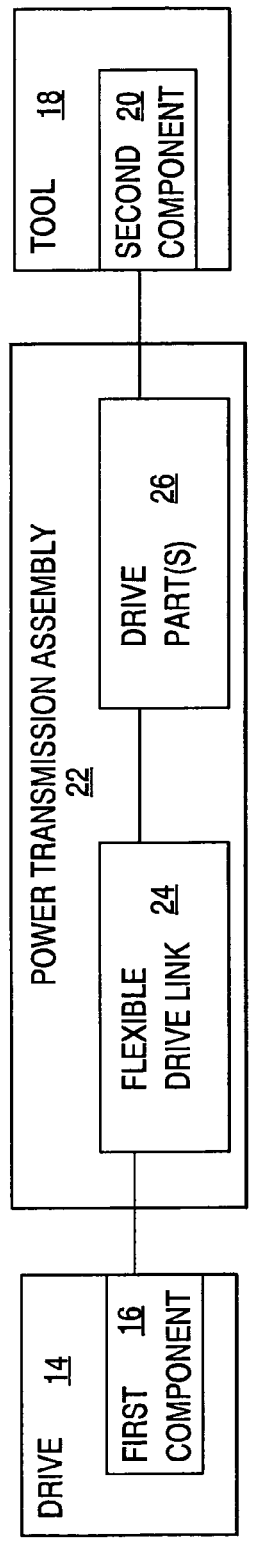
FIG. 2 is a schematic representation of a power transmission assembly on the elongate pole of FIG. 1 and acting between the drive and tool.

As seen additionally in FIG. 2, the power transmission assembly 22 consists of a flexible drive link 24 with a flexible length extending along a third axis. The flexible drive link 24 is located between the first component 16 on the drive 14 and at least one other substantially inflexible, elongate, drive part 26 that is downstream of the flexible drive link 24 and directly or indirectly operatively engages the second component 20 on the tool 18.

Figure 3:
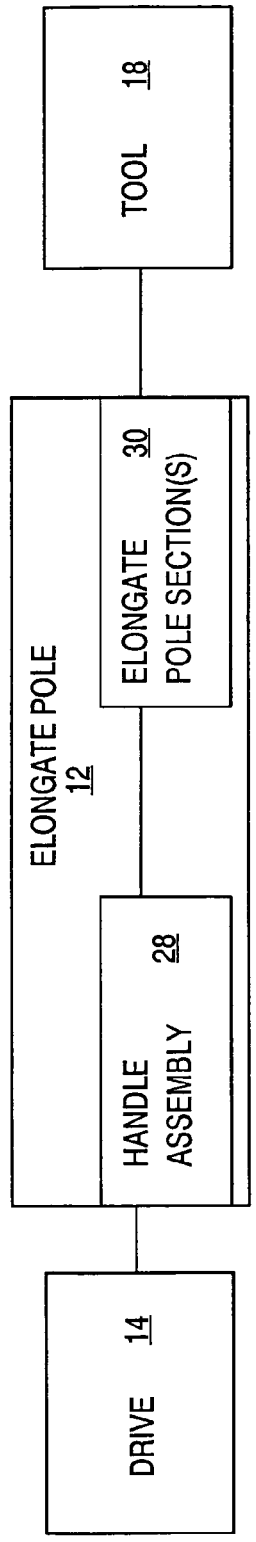
FIG. 3 is a schematic representation of the elongate pole shown in FIG. 1, to include a handle assembly and an elongate pole section(s), connecting between the drive and tool.
Figure 5:
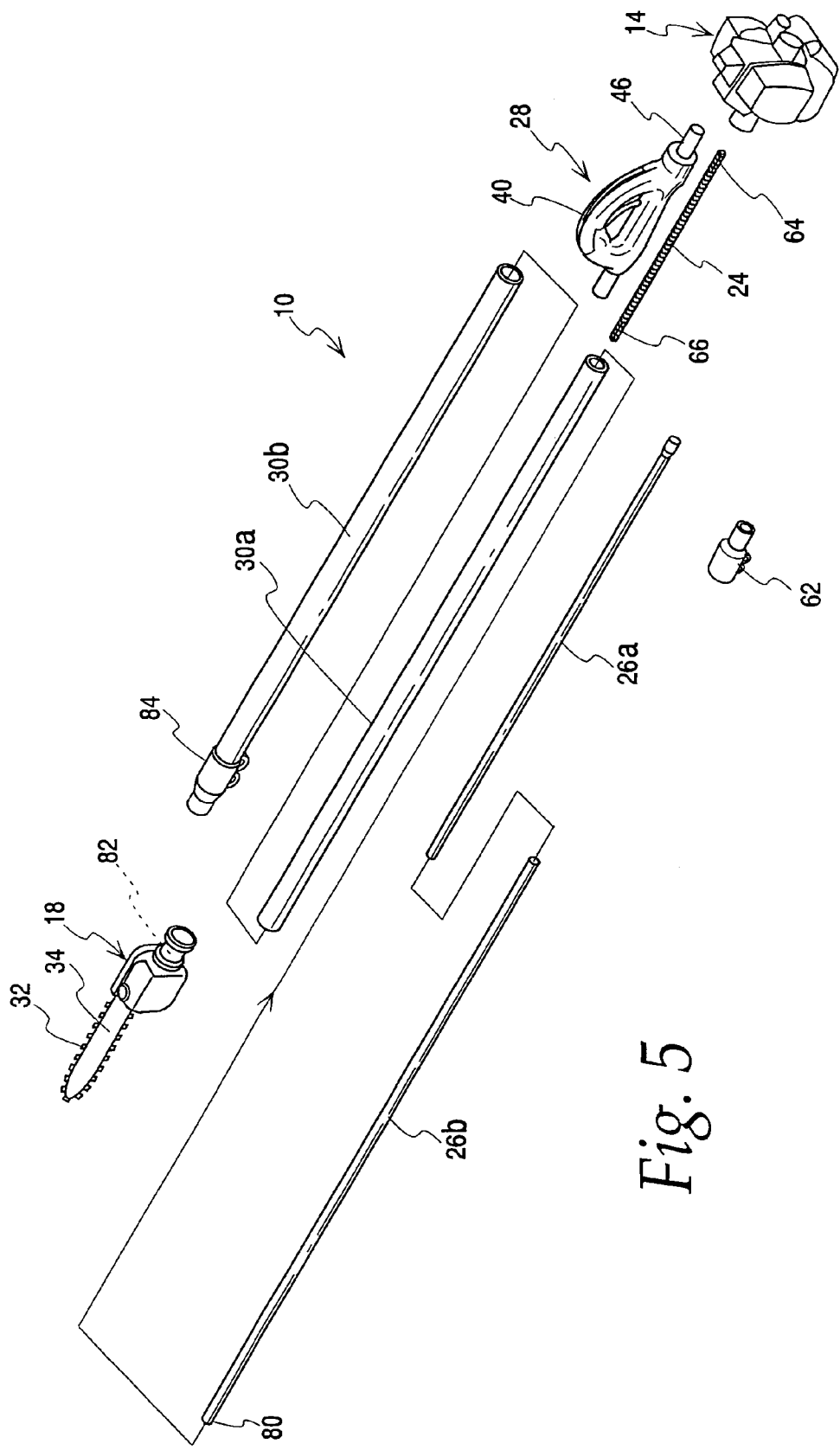
FIG. 5 is an exploded, perspective view of the powered apparatus in FIG. 4.
Figure 6:
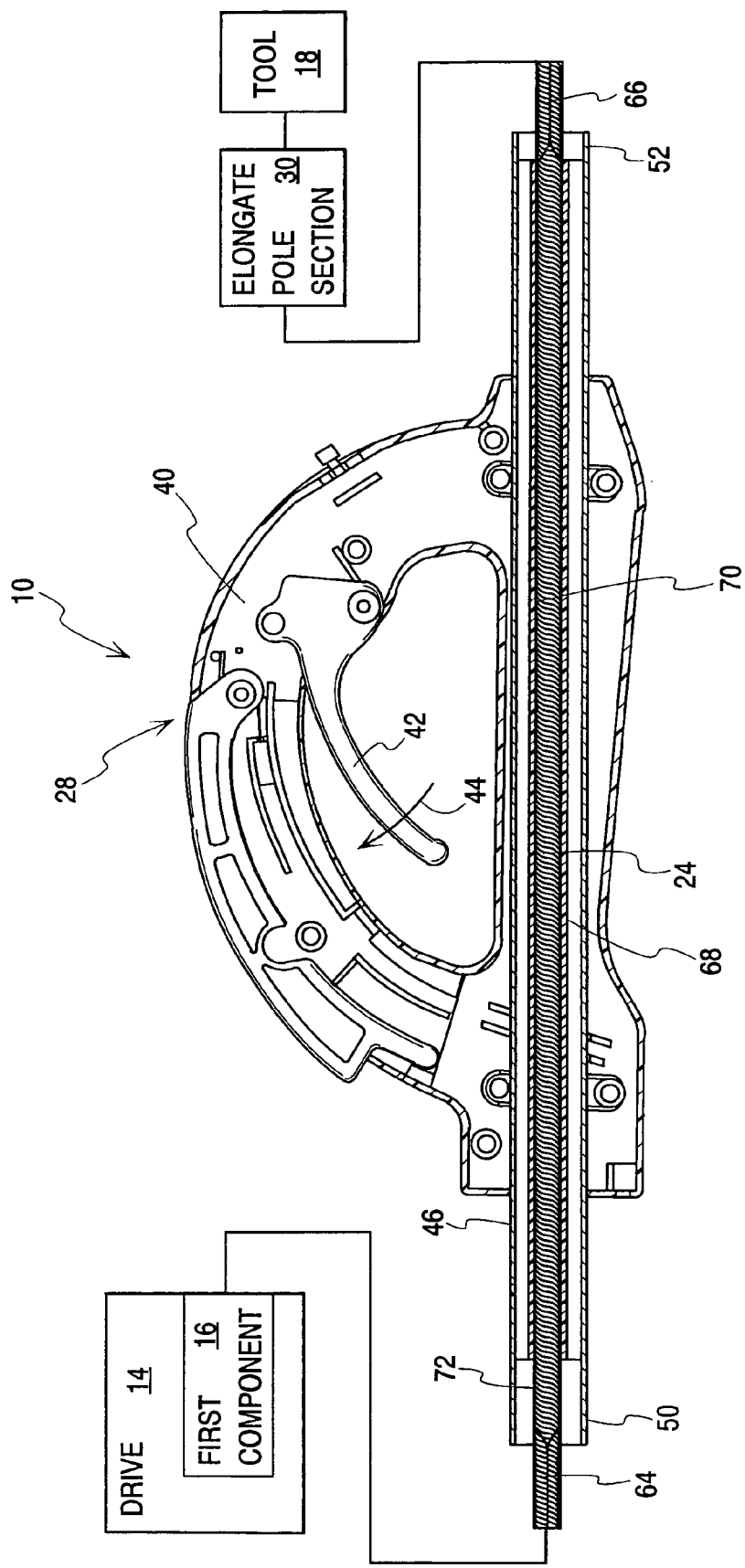
FIG. 6 is an enlarged, partially schematic, partially cross-sectional, view of the handle assembly on the elongate pole on the powered apparatus.
Figure 7:
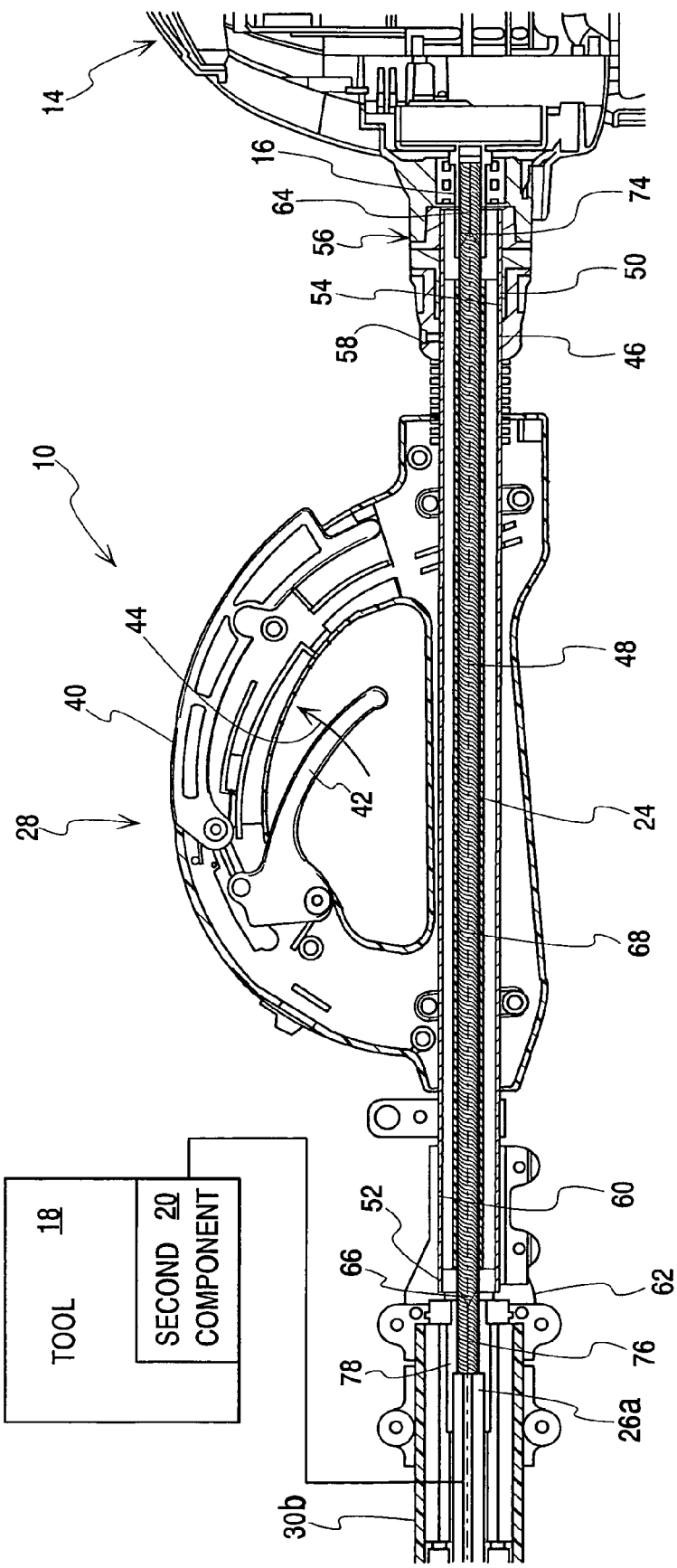
FIG. 7 is a view as in FIG. 6 with more specific details of the drive and tool associated with the handle assembly.

In one form, shown in FIG. 3, the elongate pole 12 consists of multiple components, including a handle assembly 28 that connects to one of potentially multiple elongate pole sections 30. The handle assembly 28 connects to the drive 14, with one of the elongate pole sections 30 connecting to the tool 18.

The components in FIGS. 1-3 are shown schematically because the depicted showing is intended to encompass virtually a limitless number of different variations within the broad teachings of the invention. For example, the elongate pole 12 might have a fixed length or a variable length. The drive 14 may be operated through a combustible fuel, household current, a battery, etc. The tool 18 may have any construction design to perform an operation at a location remotely from where the apparatus 10 is held by a user.

One form of the apparatus 10 will be described below with respect to FIGS. 3-10, with specific forms of the components that are shown schematically in FIGS. 1 and 3. It should be emphasized that this, and other specific forms shown and described herein, are exemplary in nature only, as variations within the scope of the teachings herein are contemplated.

The apparatus 10 is shown with an elongate pole 12 with pole sections 30a and 30b that are telescopingly engaged to permit lengthwise adjustment of the elongate pole 12 between the drive 14 and the tool 18. The tool 18 is shown with a cutting chain 32 trained around a plate 34 for guided movement in an endless cutting path. The drive 14 is provided at the proximal region 36 of the elongate pole 12, with the tool 18 provided at the distal region 38 thereof. The handle assembly 28 is provided at the proximal region 36 between the elongate pole section 30b and the drive 14.

The handle assembly 28 has a handle portion 40 around which a user's hand can be wrapped to hold and manipulate the apparatus 10. One or more fingers on the hand that is wrapped around the handle portion 40 can engage and reposition a throttle lever 42 on the handle assembly 28. Through a squeezing action, the throttle lever 42 can be moved in a pivoting action in the direction of the arrow 44 to increase the operating speed for the drive 14. In this embodiment, the drive 14 is in the form of a two cycle engine, with the throttle lever 42 controlling the speed thereof in conventional manner.

The handle assembly 28 has a sleeve 46 with a central axis 48 and first and second axially spaced ends 50, 52. With the handle assembly 28 operatively connected, the first sleeve end 50 is translated into a complementary receptacle 54 defined by a collar 56 on the drive 14. A fastener 58 extends radially through the collar 56 and against/into the sleeve 46 to secure this connection.

The second, opposite sleeve end 52 is translatable into a complementary receptacle 60 defined on a multi-part collar 62. Separate collar parts can be drawn towards each other to captively secure the sleeve end 52 in the receptacle 60.

The flexible drive link 24 resides within the sleeve 46. The flexible drive link 24 has a length with a central axis that is substantially coaxial with the central axis 48 of the sleeve 46. The flexible drive link 24 has first and second axial ends 64, 66, which respectively extend axially beyond the ends 50, 52 of the sleeve 46. A star liner 68 fits within the sleeve 46 and has an annular, radially inwardly facing surface 70 that guides the outer surface 72 of the flexible drive link 24, that is circular in cross section, in rotation around the axis 48.

The first component 16 on the drive 14 has a receptacle 74 for the first end 64 of the flexible drive 24. The cross-sectional shapes of the receptacle 74 and end 64 are complementary to allow the end 64 to be translatingly pressed into the receptacle 74 along a line parallel to the axis 48 to the operative position of FIG. 7. In this embodiment, the end 64 has a squared shape, with the receptacle 74 being complementary in configuration. Any cooperating shapes that would allow a press fit connection and a resulting keying of the elements against relative rotation is contemplated.

The end 66 of the flexible drive link 24 has a shape corresponding to that for the end 64. The end 66 telescopes into a receptacle 76 on a fitting 78 attached to one of two telescoping drive parts 26a, 26b. The drive parts 26a, 26b are elongate, rigid, and substantially inflexible. The drive parts 26a, 26b telescope to accommodate a corresponding telescoping movement of the elongate pole sections 30a, 30b and remain in driving engagement with each other throughout a permissible range of length adjustment.

The axial end 80 of the drive part 26b is moveable axially into a receptacle 82 defined on the second component 20 that is driven to operate the tool 18. The end 80 and receptacle 82 are shown with a complementary squared shape, but could be any shape that prefereably allows translational movement of the end 80 into the receptacle 82 and a resulting keying between these elements against relative rotation. The press fitting of: the end 80 and second component 20; the end 66 and drive part 26a; and the end 64 and first component 16 into keyed operative relationship facilitates assembly of the apparatus 10.

In one exemplary form, the pole section 30b has an axial length of greater than four or five feet. The pole section 30a can be extended axially therefrom to increase the overall length of the elongate pole 12. The desired, selected, length can be releaseably set by a collar 84 that can be tightened either by hand or through the use of a tool. The collar 62 can be tightened to maintain the pole section 30b and sleeve 46 in the assembled relationship of FIG. 7.

In operation, in the event that the cutting chain 32 binds or is abruptly halted as it is driven by rotation of the drive parts 26a, 26b and flexible drive link 24 around a common central axis 48 in one direction, a shock load, resisting rotation of the second component 20 in the operating direction, is absorbed by the flexible drive link 24 to avoid transmission thereof to the drive 14. The drive parts 26a, 26b are relatively inflexible and do not have any significant effect in terms of absorbing this shock load. The flexible drive line 24 primarily performs this function.

The flexible drive link 24 has a conventional wrapped coil construction. A single coiled member 88 may be continuously wrapped over a substantial portion, and more preferably over the entire length L, of the flexible drive link 24. It is conceivable that multiple coiled members could be formed into this configuration.

The wrapped member 38 extends around a hollow core 90. Inserts 92 are press fit into the hollow core 90 at each of the ends 64, 66 of the flexible drive link 24. The inserts 92 have a squared cross-sectional configuration. The coiled member 88 is press formed around the inserts 92 to conform to the square shape thereof that allows keying of the ends 64, 66 in the receptacles 74, 76, respectively on the drive 14 and fitting 78. The inserts 92 rigidify the flexible drive link 24 over an axial extent whereat the coiled member 88 is conformed closely thereto.

In one exemplary form, the flexible drive link 24 has a length L on the order of 19.8 inches. The flexible length FL, between the inserts 92, is on the order of 17.3 inches. It has been determined that a flexible length FL of less than four inches does little in terms of effective shock load absorption. While one preferred flexible length FL is 17.3 inches (hereinafter referred to as being on the order of 17 inches), lengths greater than 4 inches are contemplated depending upon the particular construction. For example, a flexible length FL of at least 12 inches is appropriate for many constructions.

Ideally, the flexible length FL of the drive link 24 has a deflection/windup rating of substantially less than 35 degrees/ft at a 70 in/pound load. In one preferred form, the flexible length FL of the flexible drive link 24 has a deflection/windup rating of on the order of 18 degrees/ft at a 70 in/pound load.

In one preferred form, the flexible shaft length is capable of absorbing on the order of 26 degrees of windup in response to a shock load that resists rotation of the second component 20 in the driving direction around its axis.

A preferred flexible shaft material for the application shown is offered by Elliot Manufacturing (B.W. Elliott Mfg. Co., LLC) of Binghamton N.Y., as its part number 10893. This part has a deflection/wind up rating of approximately 18 degree/ft at a 70 in/pound load. The flexible drive link 24 will absorb approximately 26 degrees of windup before fully transmitting shock loads to the drive 14, as noted above.

As an alternative to use of the inserts 92, a crimped sleeve member 94, as shown in FIG. 11, can be placed in surrounding relationship to the coiled member 88. The crimped sleeve member 94 has an insert portion 96 with a squared cross-sectional configuration corresponding to that for the insert 92 with the member 88 conformed thereagainst.

The foregoing disclosure of specific embodiments is intended to be illustrative of the broad concepts comprehended by the invention.

The invention claimed is:

1. A powered apparatus comprising:
    an elongate pole with a proximal region and a distal region;
    a drive at the proximal region of the elongate pole and operable to rotate a first component on the drive around a first axis;
    a tool at the distal region of the elongate pole and comprising a second component that is rotatable around a second axis in a first direction to operate the tool; and
    a power transmission assembly for transmitting a drive force generated by rotation of the first component to the second component, that is downstream of the first component, to cause rotation of the second component around the second axis and thereby operation of the tool,
    the power transmission assembly comprising a flexible drive link with a substantially straight flexible length extending along a third axis,
    the flexible drive link located between the drive and at least one other substantially inflexible drive part that is part of the power transmission assembly and downstream of the flexible drive link,
    the at least one other substantially inflexible drive part having a length greater than the flexible length of the flexible drive link,
    the flexible length of the flexible drive link greater than four (4) inches,
    wherein the flexible drive link comprises at least one coiled member,
    wherein the at least one other substantially inflexible drive part has an elongate, substantially straight shape and an axis substantially coincident with the third axis,
    a drive force from the drive transmitted from the first component to and through the flexible drive link and from the flexible drive link to and through the at least one other substantially inflexible drive part to the second component.

2. The powered apparatus according to claim 1 wherein the flexible length of the flexible drive link is at least twelve (12) inches.

3. The powered apparatus according to claim 1 wherein the flexible length of the flexible drive link is on the order of seventeen (17) inches.

4. The powered apparatus according to claim 1 wherein the flexible drive link comprises one continuously coiled member over a substantial portion of the flexible length of the flexible drive link.

5. The powered apparatus according to claim 4 wherein the flexible length of the flexible drive link has a generally circular cross-sectional shape and spaced ends and one of the spaced ends is changed from the generally circular cross-sectional shape to define a connecting fitting.

6. The powered apparatus according to claim 4 wherein the flexible drive link has spaced ends and there is a sleeve member that surrounds and is secured at one of the spaced ends to define a connecting fitting.

7. The powered apparatus according to claim 1 wherein the flexible length of the flexible drive link has a deflection/windup rating of substantially less than 35 degrees/ft at a 70 in/pound load.

8. The powered apparatus according to claim 1 wherein the flexible length of the flexible drive link has a deflection/windup rating on the order of 18 degrees/ft at a 70 in/pound load.

9. The powered apparatus according to claim 1 wherein the flexible drive link is capable of absorbing on the order of 26 degrees of windup in response to a shock load that resists rotation of the second component in the first direction around the second axis.

10. The powered apparatus according to claim 1 wherein the elongate pole has a length that is at least five (5) feet.

11. The powered apparatus according to claim 1 wherein the elongate pole comprises a handle assembly at the proximal region of the elongate pole, the handle assembly comprising a sleeve within which the flexible drive link resides, the handle assembly comprising axially spaced ends that are attachable one each to the drive and an elongate pole section of the elongate pole that resides between the handle assembly and the tool.

12. The powered apparatus according to claim 11 wherein the handle assembly comprises a handle portion around which a user's hand can be wrapped to hold and manipulate the powered apparatus.

13. The powered apparatus according to claim 12 wherein the sleeve has a central axis and axially spaced ends and the flexible drive link extends axially beyond each of the axially spaced ends of the sleeve.

14. The powered apparatus according to claim 1 wherein the flexible drive link has spaced first and second ends and the first end of the flexible drive link can be press fit into keyed operative relationship with the drive.

15. The powered apparatus according to claim 14 wherein the second end of the flexible drive link can be press fit into keyed operative relationship with the at least one other substantially inflexible drive part.

16. The powered apparatus according to claim 1 wherein the tool comprises a cutting chain that moves in an endless cutting path.

17. The powered apparatus according to claim 1 wherein the elongate pole has a variable length.

18. The powered apparatus according to claim 1 wherein the flexible drive link connects directly to the at least one other substantially inflexible drive part.

19. A powered apparatus comprising:
    an elongate pole with a proximal region and a distal region;
    a drive at the proximal region of the elongate pole and operable to rotate a first component on the drive around a first axis;
    a tool at the distal region of the elongate pole and comprising a second component that is rotatable around a second axis in a first direction to operate the tool; and
    a power transmission assembly for transmitting a drive force generated by rotation of the first component to the second component to cause rotation of the second component around the second axis and thereby operation of the tool,
    the power transmission assembly comprising a flexible drive link with a flexible length extending along a third axis,
    the flexible drive link located between the drive and at least one other substantially inflexible drive part that is downstream of the drive link, the flexible length of the flexible drive link greater than four (4) inches, wherein the flexible drive link comprises one continuously coiled member over a substantial portion of the flexible length of the flexible drive link, wherein the flexible length of the flexible drive link has a generally circular cross-sectional shape and spaced ends and one of the spaced ends is changed from the generally circular cross-sectional shape to define a connecting fitting, wherein the flexible drive link has a hollow core and there is an insert in the core at the one of the spaced ends.

20. The powered apparatus according to claim 19 wherein the insert has a non-circular outer surface and the coiled member is conformed to the non-circular outer surface of the insert.

21. A powered apparatus comprising:

an elongate pole with a proximal region and a distal region;

a drive at the proximal region of the elongate pole and operable to rotate a first component on the drive around a first axis;

a tool at the distal region of the elongate pole and comprising a second component that is rotatable around a second axis in a first direction to operate the tool; and a power transmission assembly for transmitting a drive force generated by rotation of the first component to the second component to cause rotation of the second component around the second axis and thereby operation of the tool, the power transmission assembly comprising a flexible drive link with a flexible length extending along a third axis, wherein the elongate pole comprises a handle assembly at the proximal region of the elongate pole, the handle assembly comprising a sleeve within which the flexible drive link resides, the handle assembly further comprising axially spaced ends that are attachable one each to the drive and an elongate pole section of the elongate pole that resides between the handle assembly and the tool.

22. The powered apparatus according to claim 21 wherein the handle assembly comprises a handle portion around which a user's hand can be wrapped to hold and manipulate the powered apparatus.

23. The powered apparatus according to claim 22 wherein the sleeve has a central axis and axially spaced ends and the flexible drive link extends axially beyond each of the axially spaced ends of the sleeve.

24. The powered apparatus according to claim 21 wherein the flexible drive link has spaced first and second ends and the first end of the flexible drive link can be press fit into keyed operative relationship with the drive.

25. The powered apparatus according to claim 24 wherein the second end of the flexible drive link can be press fit into keyed operative relationship with a drive part between the handle assembly and the tool.

* * * * *